United States Patent
Hu

(10) Patent No.: US 11,068,725 B2
(45) Date of Patent: Jul. 20, 2021

(54) HUD DISPLAY SYSTEM AND METHOD BASED ON LANE LINE VANISHING POINT

(71) Applicant: NIO (ANHUI) HOLDING CO., LTD., Hefei (CN)

(72) Inventor: Qingjian Hu, Shanghai (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 270 days.

(21) Appl. No.: 16/345,099

(22) PCT Filed: Jul. 28, 2017

(86) PCT No.: PCT/CN2017/095062
§ 371 (c)(1),
(2) Date: Apr. 25, 2019

(87) PCT Pub. No.: WO2018/076853
PCT Pub. Date: May 3, 2018

(65) Prior Publication Data
US 2019/0286920 A1    Sep. 19, 2019

(30) Foreign Application Priority Data
Oct. 25, 2016   (CN) .......................... 201610941443.X

(51) Int. Cl.
*H04N 7/18*       (2006.01)
*G06K 9/00*       (2006.01)
(Continued)

(52) U.S. Cl.
CPC ............ *G06K 9/00798* (2013.01); *B60R 1/00* (2013.01); *G02B 27/0101* (2013.01);
(Continued)

(58) Field of Classification Search
USPC ........................................................ 348/148
See application file for complete search history.

(56) References Cited

U.S. PATENT DOCUMENTS

2009/0225434 A1   9/2009  Nicholas et al.
2017/0080952 A1*  3/2017  Gupta ................... B60K 35/00
(Continued)

FOREIGN PATENT DOCUMENTS

| CN | 203950359 | 11/2014 |
|----|-----------|---------|
| CN | 105682973 | 6/2016 |
| WO | WO 2015/151438 | 10/2015 |

OTHER PUBLICATIONS

International Search Report prepared by the State Intellectual Property Office of the P.R. China on Oct. 11, 2017, for International Application No. PCT/CN2017/095062.
(Continued)

*Primary Examiner* — Nigar Chowdhury
(74) *Attorney, Agent, or Firm* — Sheridan Ross P.C.

(57) ABSTRACT

A HUD display system based on lane line vanishing point according to the invention includes a HUD display, characterized by further including an image acquisition device; the HUD display is further provided with a displayed image adjustment module. The image acquisition device is used for acquiring images of road surface in the traveling direction of the vehicle and the images acquired by the image acquisition device include a display interface of the HUD display. The displayed image adjustment module recognizes lane lines of the road based on the images of road surface acquired by the image acquisition device, maps an intersection point of extension lines of the lane lines on two sides of the vehicle where the intersection point is used as the vanishing point, deforms the content to be displayed and then displays the deformed content by the HUD display by taking lines, each of which connects one of two boundary points at a lower end of the display interface of the HUD display with the vanishing point, respectively, as boundaries of the adjusted display interface. The invention enables the displayed image of the HUD to better fit the road surface when viewed from (Continued)

Figure 1:
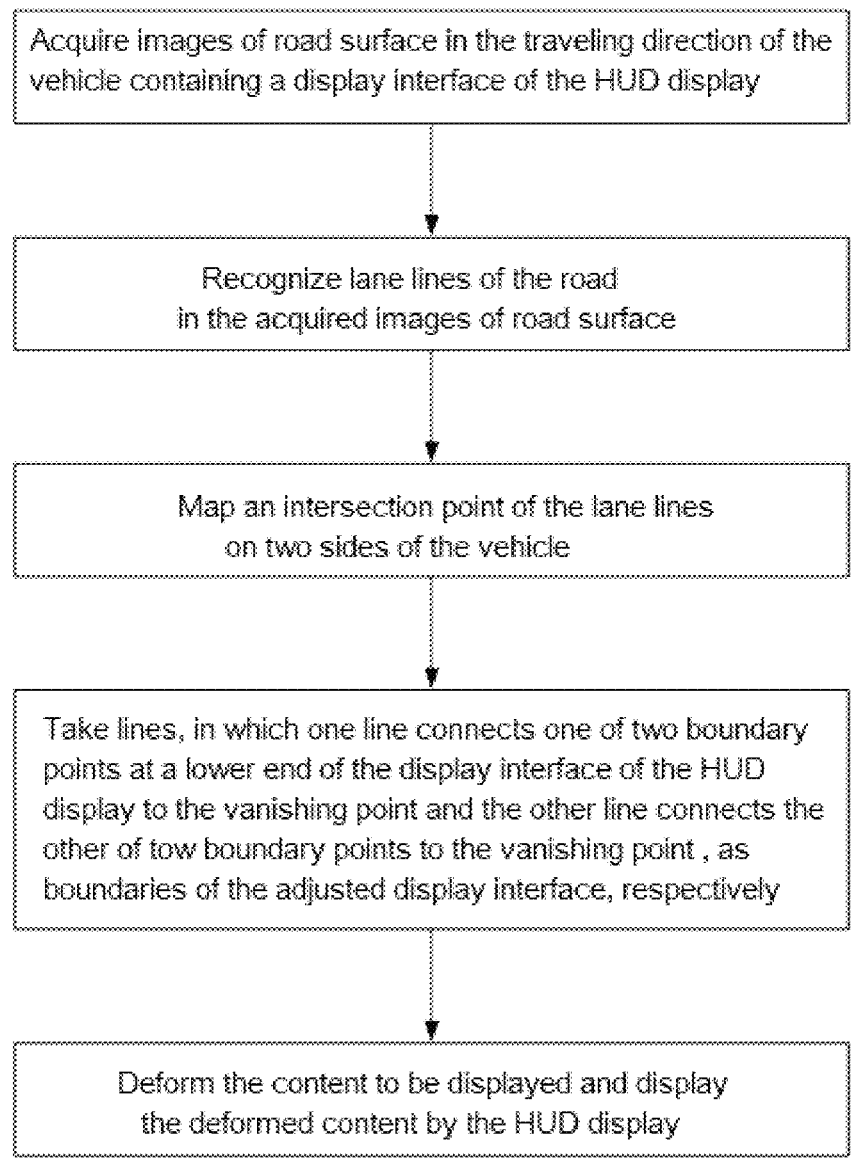

the interior of the driver's cab, thus greatly reducing the sense of foreign matters in the vision of the driver and improving the safety in driving.

10 Claims, 2 Drawing Sheets

(51) Int. Cl.
    *G02B 27/01*     (2006.01)
    *B60R 1/00*     (2006.01)

(52) U.S. Cl.
    CPC ..... *B60R 2300/205* (2013.01); *B60R 2300/30* (2013.01); *B60R 2300/8073* (2013.01)

(56) References Cited

U.S. PATENT DOCUMENTS

2017/0101092 A1*   4/2017   Nguyen Van ......... G01S 13/723
2017/0256167 A1*   9/2017   Kim ....................... G08G 1/166

OTHER PUBLICATIONS

Written Opinion prepared by the State Intellectual Property Office of the P.R. China dated Oct. 11, 2017, for International Application No. PCT/CN2017/095062.

* cited by examiner

HUD DISPLAY SYSTEM AND METHOD BASED ON LANE LINE VANISHING POINT

CROSS REFERENCE TO RELATED APPLICATIONS

This application is a national stage application under 35 U.S.C. 371 and claims the benefit of PCT Application No. PCT/CN2017/095062 having an international filing date of 28 Jul. 2017, which designated the United States, which PCT application claimed the benefit of China Patent Application No. 201610941443.X filed 25 Oct. 2016, the disclosure of each of which are incorporated herein by reference.

TECHNICAL FIELD OF THE INVENTION

The invention pertains to the field of automotive electronics, and in particular relates to a HUD display system and method based on lane line vanishing point.

BACKGROUND OF THE INVENTION

Head up display (HUD) is an auxiliary flying instrument which was previously used commonly in aircrafts. The HUD can reduce the frequency at which the pilot lowers his/her head to check the instruments, thus avoiding interruption of attention and loss of mastering state consciousness and thereby increasing safety in flying. With technical development and the increasing improvements on requirements, recent HUDs have been applied to automobiles, especially high-class automobiles. Since on-board instruments in the conventional technology are typically located at lower positions that are offset from the sight, the automobiles integrated with HUD can improve the driving safety to some extent.

Currently, the display interfaces of HUDs are mostly planar display, which has a strong sense of foreign matters and may easily affect the sight of the driver.

SUMMARY OF THE INVENTION

In order to address the above problems in the prior art, a HUD display system and method based on lane line vanishing point is proposed by the invention so that the displayed image of HUD better fits the road surface when viewed from the interior of the diver's cab, thus greatly reducing the sense of foreign matters in the vision of the driver and improving the safety in driving.

The HUD display system based on lane line vanishing point according to the invention includes a HUD display, and further includes an image acquisition device for acquiring images of road surface in the traveling direction of the vehicle; and the HUD display is further provided with a displayed image adjustment module;

the images acquired by the image acquisition device include a display interface of the HUD display;

the displayed image adjustment module recognizes lane lines of the road based on the images of road surface acquired by the image acquisition device, maps an intersection point of extension lines of the lane lines on two sides of the vehicle where in the intersection point is used as the vanishing point, deforms the content to be displayed and then displays the deformed content by the HUD display by taking lines, each of which connects one of two boundary points at a lower end of the display interface of the HUD display with the vanishing point, respectively, as boundaries of the adjusted display interface.

Preferably, the image acquisition device is a camera.

Preferably, the image acquisition device is disposed at the top inside the vehicle.

A HUD display method based on lane line vanishing point is also proposed by the invention, comprising the following steps:

at step 1, acquiring images of road surface in the traveling direction of the vehicle which contains a display interface of the HUD display;

at step 2, recognizing lane lines of the road in the acquired images of road surface;

at step 3, mapping an intersection point of extension lines of the lane lines on two sides of the vehicle and taking this intersection point as a vanishing point;

at step 4, taking lines each of which connects of two boundary points at a lower end of the display interface of the HUD display with the vanishing point as boundaries of the adjusted display interface; and at step 5, deforming the content to be displayed and displaying the deformed content by the HUD display.

Preferably, in the acquired images of road surface, a center point of the display interface of the HUD display is used as an origin point to build a two-dimensional coordinate system, the coordinates of the vanishing point and two boundary points at a lower end of the display interface of the HUD display are determined in the coordinate system, and straight lines for connecting any of the two boundary points to the vanishing point are drawn respectively; and the portions of the two straight lines that fall into the display interface of the HUD display are the boundary lines of the adjusted display interface of the HUD display.

Preferably, in deforming at step 5, a trapezoid deformation is performed on the displayed content of the HUD display, based on a trapezoid formed by the boundary lines of the adjusted display interface of the HUD display.

Preferably, in mapping the vanishing point, middle lines of the lane lines are drawn after the lane lines are recognized, and an intersection point of the extension lines of the middle lines of two adjacent lane lines is the vanishing point to be found.

Preferably, the images of road surface in the traveling direction of the vehicle containing a display interface of the HUD display are images of individual frames in the traveling video of the camera, and steps 1 to 5 are executed on the image of each frame.

Through the deformation processing on the displayed image of the HUD display, the invention enables the displayed image of the HUD to better fit the road surface when viewed from the interior of the driver's cab, thus greatly reducing the sense of foreign matters in the vision of the driver and improving the safety in driving.

BRIEF DESCRIPTION OF THE ACCOMPANYING DRAWINGS

Figure 2:
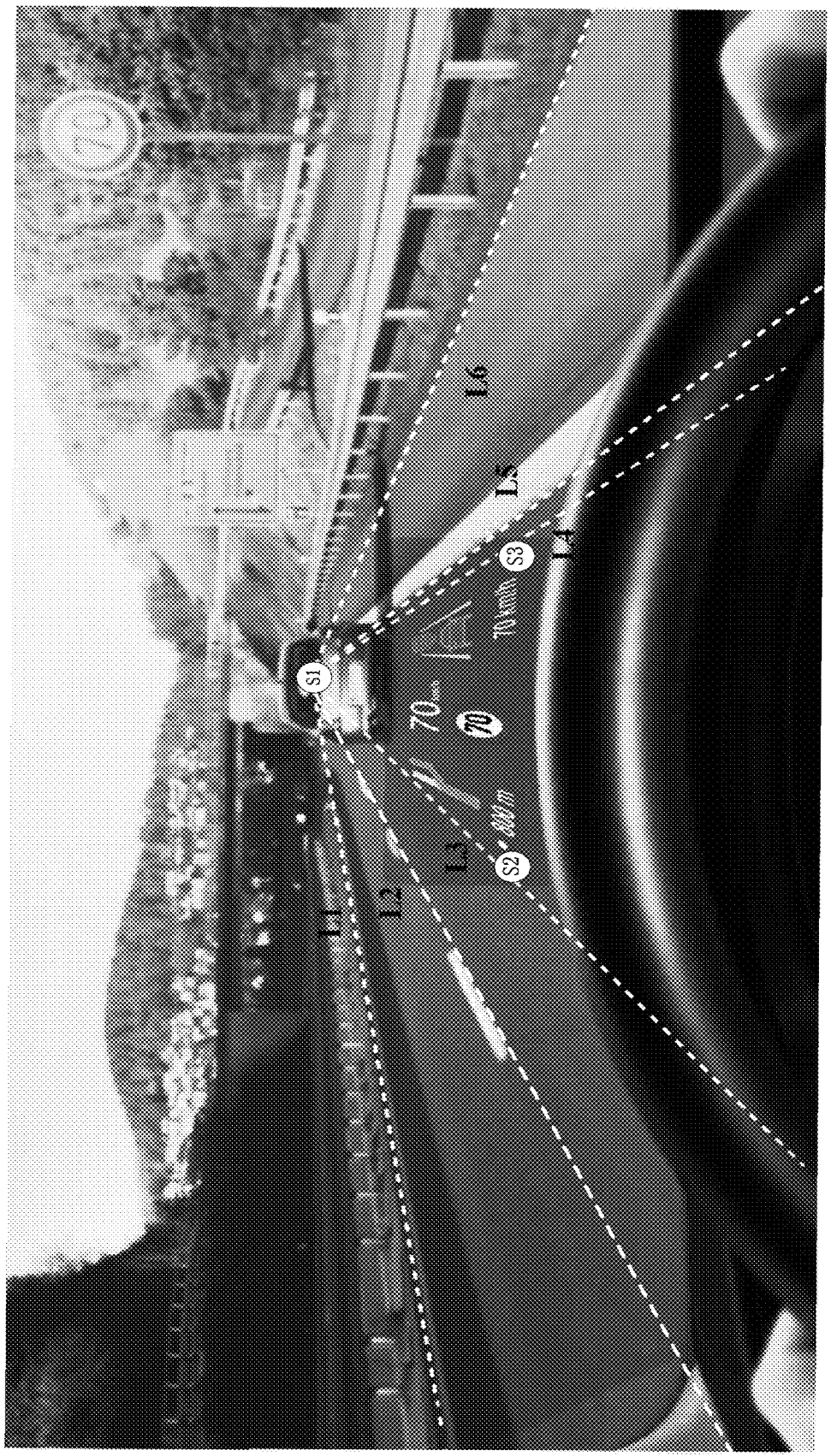

FIG. 1 is a schematic flowchart showing the HUD display method based on lane line vanishing point of the invention; and FIG. 2 is a schematic view showing the determination of boundary lines of the displayed content of the HUD in an actual road condition.

DETAILED DESCRIPTION OF THE PREFERRED EMBODIMENTS

Preferred embodiments of the invention will be described below with reference to the accompanying drawings. It should be understood by those skilled in the art that these embodiments are merely provided for the purpose of illustrating the technical principle of the invention instead of limiting the scope of protection of the invention.

The HUD display system based on lane line vanishing point according to the invention includes a HUD display and an image acquisition device, where the HUD display is further provided therein with a displayed image adjustment module.

The image acquisition device is used for acquiring images of road surface in the traveling direction of the vehicle, and the acquired images include a display interface of the HUD display. In the present embodiment, the image acquisition device is a camera disposed at the top inside the vehicle.

The displayed image adjustment module recognizes lane lines of the road based on the images of road surface acquired by the image acquisition device, maps an intersection point of extension lines of the lane lines on two sides of the vehicle and using the intersection point as a vanishing point, deforms the content to be displayed by the HUD display and then displays the deformed content by the HUD display, by taking lines, each of which connects one of two boundary points at a lower end of the display interface of the HUD display with the vanishing point, respectively, as boundaries of the adjusted display interface. Specifically, one of the two boundary points at a lower end of the display interface of the HUD display is an intersection point of the lower boundary line of the display interface of the HUD display and a left boundary line, and the other is an intersection of the lower boundary line of the display interface of the HUD display and a right boundary line.

As shown in FIG. 1, a HUD display method based on lane line vanishing point is proposed by the invention, comprising the following steps:

At step 1, acquiring images of road surface in the traveling direction of the vehicle which contain a display interface of the HUD display;

At step 2, recognizing lane lines of the road in the acquired images of road surface;

At step 3, mapping an intersection point of extension lines of the lane lines on two sides of the vehicle and using the intersection point as a vanishing point;

At step 4, taking two lines, in which one line connects one of two boundary points at a lower end of the display interface of the HUD display with the vanishing point and the other line connects the other of tow boundary points with the vanishing point, as boundaries of the adjusted display interface, respectively; and At step 5, deforming the content to be displayed and displaying the deformed content by the HUD display, thereby realizing the displaying effect of making the HUD image fit the road surface.

In the present embodiment, in the acquired images of road surface, a center point of the display interface of the HUD display is used as an origin point to build a two-dimensional coordinate system, the coordinates of the vanishing point and two boundary points at a lower end of the display interface of the HUD display are determined in the coordinate system, and straight lines connecting the two boundary points and the vanishing point are drawn respectively; and the portions of the two straight lines that fall into the display interface of the HUD display are the boundary lines of the adjusted display interface of the HUD display.

In deforming at step 5, a trapezoid deformation is performed on the displayed content of the HUD display, based on a trapezoid formed by the boundary lines of the adjusted display interface of the HUD display.

In mapping the vanishing point, middle lines of the lane lines are drawn after the lane lines are recognized, and an intersection point of the extension lines of the middle lines of two adjacent lane lines is the vanishing point to be found. In a practical application of the technical solution of the invention, an intersection of extension lines of inner side boundaries of two adjacent lane lines can be also used to determine the vanishing point, or an intersection of extension lines of outer side boundaries of two adjacent lane lines can be also used to determine the vanishing point. Herein, the inner side boundaries refer to the boundary lines of the lane lines of the lane at which the vehicle is located facing towards the vehicle, and the outer side boundary refers to the boundary line of one of the lane lines on lane at which the vehicle is located away from the vehicle.

In FIG. 2, an intersection point of the extension lines of inner side boundaries of two adjacent lane lines is used to determine the vanishing point. For ease of description, herein, dash lines are referred to as L1~L6 in the figure from left to right, wherein L1 and L6 are extension lines of road shoulders, L2 and L5 are extension lines of inner side boundaries of the lane lines on two sides of the lane at which the vehicle is located, and L3 and L4 are extension lines of the boundary lines of the display interface of the HUD display. S1 is the position of the vanishing point, the intersection point of L1 and L6 coincides with the intersection point of L2 and L5, both of which is S1; and S2 and S3 are left and right boundary points at a lower end of the display interface of the HUD display respectively. A line connecting S2 and S1 creates a left boundary straight line L3 of the adjusted display interface of the HUD display, and a line connecting S3 and S1 creates a right boundary straight line L4 of the adjusted display interface of the HUD display. The lines L3, L4 and upper and lower edges of the display interface of the HUD display create the adjusted display interface.

The images of road surface in the traveling direction of the vehicle containing a display interface of the HUD display are images of individual frames in the traveling video of the camera, and steps 1 to 5 are executed on the image of each frame.

It will be appreciated by those skilled in the art that the modules and method steps of various examples described in combination with the embodiments disclosed herein can be implemented in electronic hardware or computer software or in both. In order to clearly illustrate the exchangeability of the electronic hardware and software, in the above description, the components and steps of various examples have been described in a generic sense according to functions thereof. Whether these functions are eventually executed in the form of electronic hardware or software depends upon the specific application and design constraints of the technical solution. Those skilled in the art can realize the described functions by using different methods for each particular application. However, such an implementation should not be considered as going beyond the scope of the invention.

The technical solutions of the invention have hitherto been described in combination with the preferred embodiments as shown in the drawings. However, it can be readily understood by those skilled in the art that the scope of protection of the invention is obviously not limited to these specific embodiments. Under the premise of not departing from the principle of the invention, those skilled in the art can make equivalent variations or replacements to relevant technical features, and such technical solutions after variations or replacements will all fall within the scope of protection of the invention.

What is claimed is:

1. A HUD display system based on lane line vanishing point, including a HUD display, characterized by further including an image acquisition device for acquiring images of road surface in the traveling direction of the vehicle; and the HUD display is further provided with a displayed image adjustment module;

wherein the images acquired by the image acquisition device include a display interface of the HUD display;

wherein the displayed image adjustment module recognizes lane lines of the road based on the images of road surface acquired by the image acquisition device, maps an intersection point of extension lines of the lane lines on two sides of the vehicle where the intersection point is used as the vanishing point, deforms the content to be displayed and then displays the deformed content by the HUD display by taking two lines, each of which connects one of two boundary points at a lower end of the display interface of the HUD display with the vanishing point, respectively, as boundaries of the adjusted display interface.

2. The HUD display system based on lane line vanishing point according to claim 1, wherein the image acquisition device is a camera.

3. The HUD display system based on lane line vanishing point according to claim 1, wherein the image acquisition device is disposed at the top inside the vehicle.

4. A HUD display method based on lane line vanishing point, characterized by comprising the following steps:

at step 1, acquiring images of road surface in the traveling direction of the vehicle, said vehicle containing a display interface of the HUD display;

at step 2, recognizing lane lines of the road in the acquired images of road surface;

at step 3, mapping an intersection point of extension lines of the lane lines on two sides of the vehicle and using said intersection point as a vanishing point;

at step 4, taking two lines, each of which connects one of two boundary points at a lower end of the display interface of the HUD display with the vanishing point, as boundaries of the adjusted display interface; and at step 5, deforming the content to be displayed and displaying the deformed content by the HUD display.

5. The HUD display method based on lane line vanishing point according to claim 4, wherein in the acquired images of road surface, a center point of the display interface of the HUD display is used as an origin point to build a two-dimensional coordinate system, the coordinates of the vanishing point and two boundary points at a lower end of the display interface of the HUD display are determined in the coordinate system, and straight lines for connecting any of the two boundary points to the vanishing point are drawn respectively; and the portions of the two straight lines that fall into the display interface of the HUD display are the boundary lines of the adjusted display interface of the HUD display.

6. The HUD display method based on lane line vanishing point according to claim 5, wherein in the deforming at step 5, a trapezoid deformation is performed on the displayed content of the HUD display, based on a trapezoid formed by the boundary lines of the adjusted display interface of the HUD display.

7. The HUD display method based on lane line vanishing point according to claim 6, wherein in mapping the vanishing point, middle lines of the lane lines are drawn after the lane lines are recognized, and an intersection point of the extension lines of the middle lines of two adjacent lane lines is the vanishing point to be found.

8. The HUD display method based on lane line vanishing point according to claim 7, wherein the images of road surface in the traveling direction of the vehicle containing a display interface of the HUD display are images of individual frames in the traveling video of the camera, and steps 1 to 5 are executed on the image of each frame.

9. The HUD display method based on lane line vanishing point according to claim 5, wherein in mapping the vanishing point, middle lines of the lane lines are drawn after the lane lines are recognized, and an intersection point of the extension lines of the middle lines of two adjacent lane lines is the vanishing point to be found.

10. The HUD display method based on lane line vanishing point according to claim 9, wherein the images of road surface in the traveling direction of the vehicle containing a display interface of the HUD display are images of individual frames in the traveling video of the camera, and steps 1 to 5 are executed on the image of each frame.

* * * * *